US 6,709,882 B2

(12) United States Patent
Trammel et al.

(10) Patent No.: US 6,709,882 B2
(45) Date of Patent: Mar. 23, 2004

(54) PLANAR LIGHTWAVE CIRCUIT ACTIVE DEVICE METALLIZATION PROCESS

(75) Inventors: Pamela S. Trammel, San Jose, CA (US); Jonathan G. Bornstein, Cupertino, CA (US); David H. Menche, Redwood City, CA (US)

(73) Assignee: Lightwave Microsystems Corporation, San Jose, CA (US)

(*) Notice: Subject to any disclaimer, the term of this patent is extended or adjusted under 35 U.S.C. 154(b) by 0 days.

(21) Appl. No.: 09/940,567

(22) Filed: Aug. 27, 2001

(65) Prior Publication Data

US 2003/0040135 A1 Feb. 27, 2003

(51) Int. Cl.$^7$ ............................................... H01L 21/00
(52) U.S. Cl. ......................... 438/29; 438/31; 438/618; 438/689; 385/129; 385/130; 385/131
(58) Field of Search ................................. 438/695, 689, 438/29, 618, 31; 385/129, 130, 131

(56) References Cited

U.S. PATENT DOCUMENTS

| 3,649,945 A | * | 3/1972 | Waits | 257/763 |
|---|---|---|---|---|
| 4,472,239 A |  | 9/1984 | Johnson | 156/647 |
| 4,489,742 A |  | 12/1984 | Moore | 136/203 |
| 4,571,608 A |  | 2/1986 | Johnson | 357/28 |
| 4,867,842 A |  | 9/1989 | Bohrer | 156/647 |
| 4,983,225 A |  | 1/1991 | Rowe | 136/201 |
| 5,231,054 A |  | 7/1993 | Kosugi | 437/192 |
| 5,780,875 A | * | 7/1998 | Tsuji et al. | 257/81 |
| 5,877,045 A |  | 3/1999 | Kapoor | 438/151 |
| 6,083,770 A |  | 7/2000 | Sato | 438/54 |
| 6,100,199 A |  | 8/2000 | Joshi | 438/694 |
| 6,171,879 B1 |  | 1/2001 | Chan | 438/52 |
| 6,259,350 B1 |  | 7/2001 | Mueller-Fiedler | 338/25 |
| 6,285,542 B1 | * | 9/2001 | Kennedy et al. | 361/328 |
| 6,366,730 B1 | * | 4/2002 | Cappuzzo et al. | 385/129 |
| 6,424,755 B1 | * | 7/2002 | Clapp | 385/3 |
| 6,507,681 B1 | * | 1/2003 | Kowalczyk et al. | 385/16 |
| 2002/0018636 A1 | * | 2/2002 | Bischel et al. | 385/140 |
| 2002/0075346 A1 | * | 6/2002 | Xu et al. | 347/20 |

FOREIGN PATENT DOCUMENTS

WO    WO 01/06547 A1   *  1/2001

* cited by examiner

Primary Examiner—Amir Zarabian
Assistant Examiner—Jeff Vockrodt
(74) Attorney, Agent, or Firm—Wagner, Murabito, & Hao LLP (57) ABSTRACT

A method for making a resistive heater for a planar lightwave circuit. The method includes the step of depositing a resistive layer on a top clad of a planar lightwave circuit. An interconnect layer is subsequently deposited over the resistive layer. The resistive layer can be tungsten and the interconnect layer can be aluminum. The interconnect layer is then etched to define a heater interconnect, wherein the heater interconnect is disposed over the resistive layer and has a first width. The heater interconnect is then masked, and the resistive layer is etched to define a resistive heater. The resistive heater is disposed beneath the heater interconnect and has a second width larger than the first width. The heater interconnect is defined to include a heater conduct region between a first contact pad and a second contact pad such that a current between the first contact pad and the second contact pad is conducted through the resistive heater, thereby generating heat which is conducted into the top clad of the planar lightwave circuit. The difference between the first width of the heater interconnect and the larger second width of the underlying resistive heater is determined to decrease an alignment sensitivity of a lithography process for masking the heater interconnect. A dry etch process can be used to etch the aluminum interconnect layer and/or the tungsten resistive layer. The dry etch process can be a reactive ion etching process. A wet etch process can be used to etch the aluminum interconnect layer, wherein the wet etch process does not attack the tungsten.

21 Claims, 7 Drawing Sheets

FIG. 1

(Prior Art)

PLANAR LIGHTWAVE CIRCUIT ACTIVE DEVICE METALLIZATION PROCESS

FIELD OF THE INVENTION

The present invention relates generally to active-type planar lightwave circuits. More particularly, the present invention relates to a method for depositing precise metallization areas for refractive index control in active-type of planar lightwave circuits.

BACKGROUND OF THE INVENTION

Planar lightwave circuits comprise fundamental building blocks for the modern fiber optic communications infrastructure. Planar lightwave circuits (PLCs) are generally devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

PLCs generally involve the provisioning of a series of embedded optical waveguides upon a semiconductor substrate, with the optical waveguides fabricated from a silica glass. Planar lightwave circuits are constructed using the advanced tools and technologies developed by the semiconductor industry. Modern semiconductor electronics fabrication technology can aggressively address the increasing need for integration currently being used to make PLCs. By using manufacturing techniques closely related to those employed for silicon integrated circuits, a variety of optical elements can be placed and interconnected on the surface of a silicon wafer or similar substrate. This technology has only recently emerged and is advancing rapidly with leverage from the more mature tools of the semiconductor-processing industry.

PLCs are constructed with a number of waveguides precisely fabricated and laid out across a silicon wafer. A conventional optical waveguide comprises an un-doped silica bottom clad layer, with at least one waveguide core formed thereon, and a cladding layer covering the waveguide core, wherein a certain amount of at least one dopant is added to both the waveguide core and the cladding layer so that the refractive index of the waveguide core is higher than that of the cladding layer. Fabrication of conventional optical waveguides involves the formation of a silica layer as the bottom clad (BC), usually grown by thermal oxidation, or flame hydrolysis deposition (FHD), upon a silicon semiconductor wafer. The core layer is a doped silica layer, which is deposited by either plasma-enhanced chemical vapor deposition (PECVD) or FHD. An annealing procedure then is applied to this core layer (heated above 1000 C.). The waveguide pattern is subsequently defined by photolithography on the core layer, and reactive ion etching (RIE) is used to remove the excess doped silica to form one or more waveguide cores. A top cladding layer is then formed through a subsequent deposition process. Finally, the wafer is cut into multiple planar lightwave circuit dies and packaged according to their particular applications.

Figure 1:
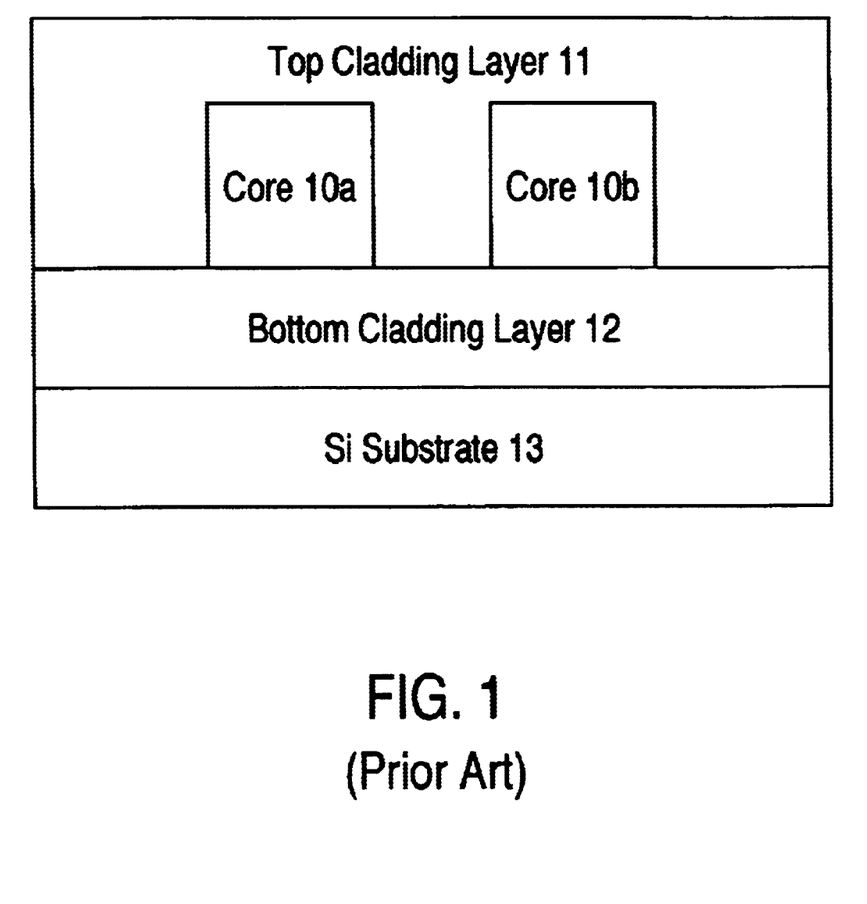
FIG. 1 shows a cross-section view of a conventional planar optical waveguide device fabricated on a silicon substrate.

Prior art FIG. 1 shows a cross-section view of two planar optical waveguides of a conventional PLC. As depicted in FIG. 1, the planar optical waveguides include two doped $SiO_2$ glass cores 10a–10b formed over a $SiO_2$ bottom cladding layer 12 which is on a silicon substrate 13. A $SiO_2$ top cladding layer 11 covers both the cores 10a–b and the bottom cladding layer 12. As described above, the refractive index of the cores 10a–b is higher than that of top cladding layer 11 and the bottom clad 12. Consequently, optical signals are confined axially within cores 10a–b and propagate lengthwise through cores 10a–b.

PLC devices having multiple cores comprise the basic building blocks of active type optical devices. One such increasingly important optical device is an optical switch. As optical communications networks become more complex and carry more data traffic, optical switches play an increasingly important role. Optical switches play an increasingly important role as today's optical networks become more complex and carry more capacity. Optical switches can be deployed in applications such as network protection and restoration and dynamically reconfigurable add/drop modules. Although several switching technologies are available (e.g., opto-mechanical type switches, liquid crystal, etc.), PLC based thermo-optic switches, where light is guided in planar waveguides, is emerging as reliable technology of choice.

PLC based thermo-optic switches utilize materials such as silica or polymers which exhibit the "thermo-optic effect", wherein their refractive indices change as their temperature is changed. This thermo-optic coefficient could either be positive like silica (approximately $10^{-5}/° C.$) or negative like polyimide (approximately $10^{-4}/° C.$). This type of switch is fast enough for protection and restoration purposes, compact, and well suited for integration with other PLC components, such as arrayed waveguide gratings, to form more complicated modules like an optical add/drop multiplexers. These thermo-optic effect based devices have been used in a variety of systems, such as, for example, optical switches, variable optical attenuators (VOAs), dynamic gain flattening filters (DGFF), and integrated devices such as a VMUX (VOA plus MUX).

Figure 2:
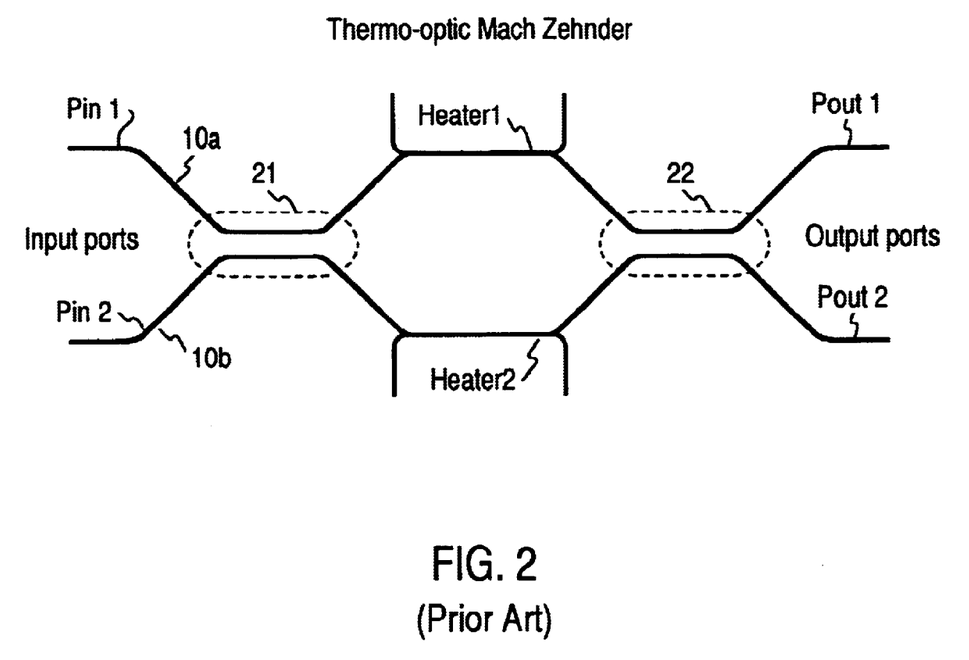
FIG. 2 shows a diagram of a conventional Mach-Zehnder thermo-optic switch.

Prior art FIG. 2 shows a diagram of a Mach-Zehnder thermo-optic switch. As depicted in FIG. 2, a first waveguide (core 10a) and a second waveguide (core 10b) are used to implement input ports (e.g., Pin1 and Pin2) and output ports (e.g., Pout1 and Pout2) as shown. The first and second waveguides pass through a first coupling region 21 and a second coupling region 22. A resistive thin film heater is deposited above each waveguide between the two coupling regions 21–22 (e.g., heater1 and heater2).

The heaters are used to selectively heat one waveguide core or the other to change its refractive index, and thereby modulate an accumulated phase difference of light propagating through the two waveguide cores 10a–b. When light is launched into one of the input ports, it is split into the two cores 10a–b by the first coupler 21 with equal optical power and ½ phase difference. As light travels through the waveguide cores 10a–b, the phase difference can be altered using a temperature difference between the two cores, as controlled by the two heaters. After passing through the second coupler 22, the two beams recombine either constructively or destructively at either of the two output ports, depending upon the exact phase difference between the two cores 10a–b. The exact phase difference is controlled by precisely controlling the current/voltage applied to the heaters. This modulation of temperature achieves the purpose of switching the light between the two output ports. The electrical power needed to switch each path is typically on the order of a few hundred milliwatts. Switches can also be cascaded for added extinction ratio without sacrificing much on insertion loss. The same technique can be used in VOA devices and other types of thermo-optic active PLC devices.

There exists problems with the prior art metallization process for the above described types of thermo-optic PLC devices. Different metals are chosen for heater and interconnect due to the different conductivity requirements for each layer. One must be capable of etching these differing metals without adversely affecting the other. These metals must be in contact with each other, which drives the requirement for highly selective etch processes. Ideally, those processes in which one layer etches readily and the other not at all. Adhesion of the two materials must be maintained. Many prior art thermo-optic PLC devices utilize chrome as the heater material and gold as the interconnect material. A chrome wet etch process requires special disposal due to the heavy metal content. Thus, the chrome wet etch process is thus overly expensive and time-consuming. Both gold and chrome can be dry etched using chlorine. The etchers designed to handle the corrosive chlorine gas can be complex and expensive. One must etch the interconnect without attacking the heater layer. Conversely, one must etch the heater without attacking the interconnect layer. High selectivity between gold and chrome and the photolithography mask is difficult to achieve with a chlorine dry etch process.

Gold is difficult to work with due to the fact that there tend to be adhesion problems (e.g., between gold and silica and between gold and chrome). Gold typically requires an adhesion layer to ensure its integrity. Prior art attempts to use gold interconnects on nickel thin film heaters were not effective in solving the adhesion problems. Even when combined with nickel heaters, the gold tends to "peel" during wet etch patterning.

Another problem involves interconnect alignment during patterning and etching of the overlying layer. During prior art gold/chrome processes, gold and chrome metal layers are typically deposited and patterned separately. However, alignment of the overlying elements from the overlying layer is critical. For example, in a case where the underlying layer is used to pattern and form the heater (e.g., chrome) in one deposition/etch process, it is critical that the overlying layer (e.g., gold) is deposited, patterned, and etched such that the interconnects are in the correct location with respect to the heaters. This precise alignment can be difficult to attain.

In another prior art method, the interconnect and heater patterns are deposited and etched at the same time. This method requires a photolithographic mask that has sufficient selectivity to withstand both etches. There is the added disadvantage of requiring good line width control during both metal etches. A second masking and etch step is needed to remove the conductive layer from the heater region. Thus, alignment is critical for both masking steps.

Thus what is required is a solution that eliminates fabrication problems involved in working with chrome and gold in PLC device fabrication. What is required is a solution that eliminates interconnect alignment problems in the fabrication of PLC devices. What is further required is a solution that increases the yield and reliability of active thermo-optic PLC devices. The present invention provides a novel solution to the above requirements.

SUMMARY OF THE INVENTION

The present invention is an active device metallization process that eliminates PLC fabrication problems involved in working with chrome and gold in PLC device fabrication. The present invention provides a solution that eliminates interconnect alignment problems in the fabrication of PLC devices. The present invention provides a solution that reduces the number of critical dimensions. The present invention provides a solution that improves adhesion of the interconnect layer. The present invention provides a solution that increases the yield and reliability of active thermo-optic PLC devices.

In one embodiment, the present invention is implemented as an active device metallization process for making resistive heaters for a planar lightwave circuits. The process includes the step of depositing a resistive layer on a top clad of a planar lightwave circuit. An interconnect layer is subsequently deposited over the resistive layer. In this embodiment, tungsten is used for the resistive layer and aluminum is used for the interconnect layer. The both heater and interconnect layers are deposited across the entire surface of the PLC wafer sequentially. The interconnect layer is then patterned (e.g., masked using photolithography techniques) and etched to define a heater interconnect over the resistive layer. The heater interconnect is then masked, and the resistive layer is etched to define a resistive heater. Thus, both the resistive layer and the interconnect layer can be deposited prior to the patterning and etching steps.

The heater interconnect is disposed entirely over the resistive heater, and has a smaller width than the resistive heater such that a portion of the resistive heater is exposed entirely around the periphery of the heater interconnect. The heater interconnect is defined to include a "heater conduct region" between a first contact pad and a second contact pad such that a current between the first contact pad and the second contact pad is conducted through the heater conduct region of the resistive heater, thereby generating heat which is conducted into the top clad of the PLC. The heater conduct region is located on the top clad above the core.

The difference between the smaller width of the heater interconnect and the larger width of the underlying resistive heater is sized to be sufficiently large to decrease an alignment sensitivity of the lithography process for patterning the heater interconnect. The resistive heater is essentially an "oversize" version of the heater interconnect. Thus the only critical alignment is that of the heater conduct region with respect to the underlying waveguide core. This eliminates the interconnect alignment problems of the prior art fabrication processes.

Similarly, the only critical dimension is the width of the heater conduct region. Hence, the only line width that is critical to control is the heater conduct region line width.

A dry etch process can be used to etch the aluminum interconnect layer and/or the tungsten resistive layer. The dry etch process can be a reactive ion etching process. A wet etch process can be used to etch the aluminum interconnect layer. For either wet or dry processes wherein the aluminum etch does not attack the tungsten. Both the dry and wet etch processes are less expensive and less time-consuming than the prior art etch processes for chrome and gold. Chemicals involved in the etching of aluminum and tungsten are much less hazardous than those involved with the etching of chrome. This eliminates the prior art problems from working with chrome and gold in PLC device fabrication.

BRIEF DESCRIPTION OF THE DRAWINGS

The present invention is illustrated by way of example and not by way of limitations in the Figures of the accompanying drawings and in which like reference numerals refer to similar elements and in which.

Prior art

Prior art

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Embodiments of the present invention are directed towards an active device metallization process that eliminates PLC fabrication problems involved in working with chrome and gold in PLC device fabrication. The present invention provides a solution that eliminates interconnect alignment problems in the fabrication of PLC devices. The present invention provides a solution that reduces the number of critical dimensions. The present invention provides a solution that improves adhesion of the interconnect layer. The present invention provides a solution that increases the yield and reliability of active thermo-optic PLC devices. The present invention and its benefits are further described below.

Figure 3:
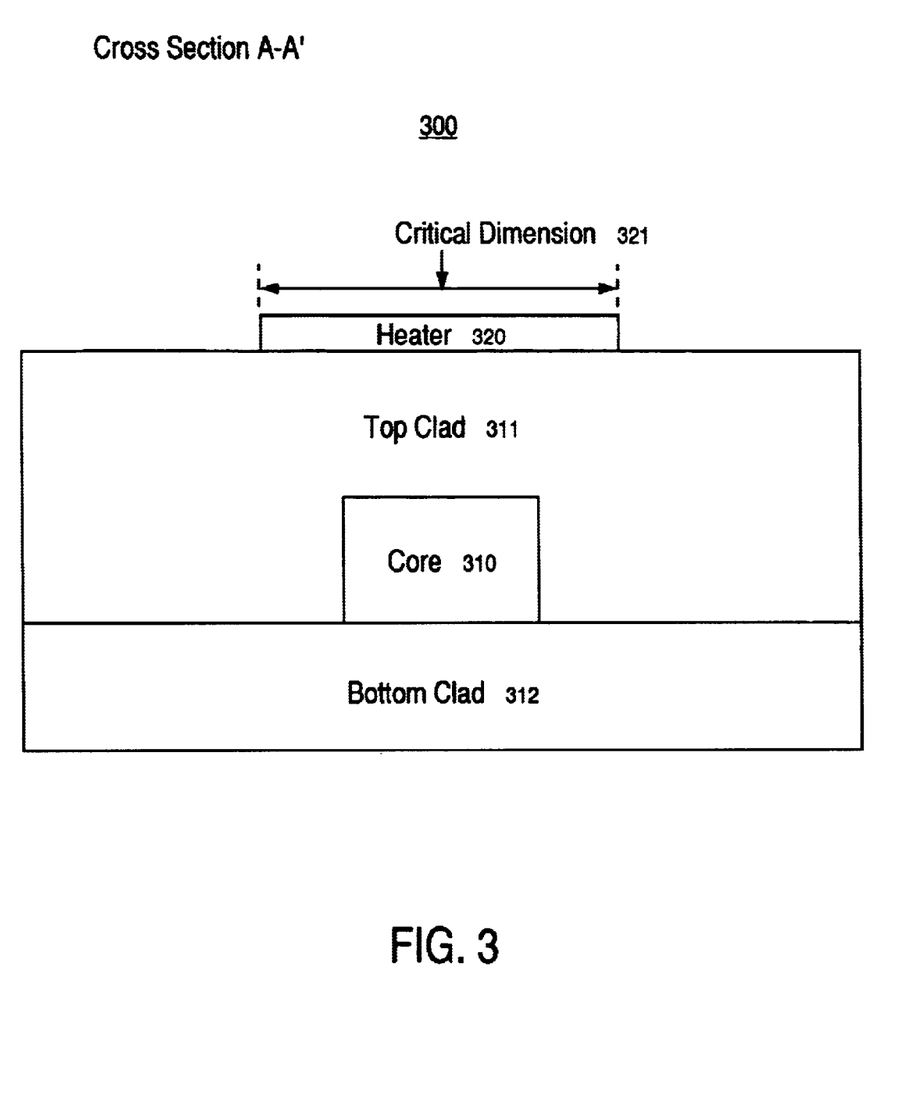
FIG. 3 shows a first cross-section view of an optical waveguide structure of a PLC device in accordance with one embodiment of the present invention.
Figure 4:
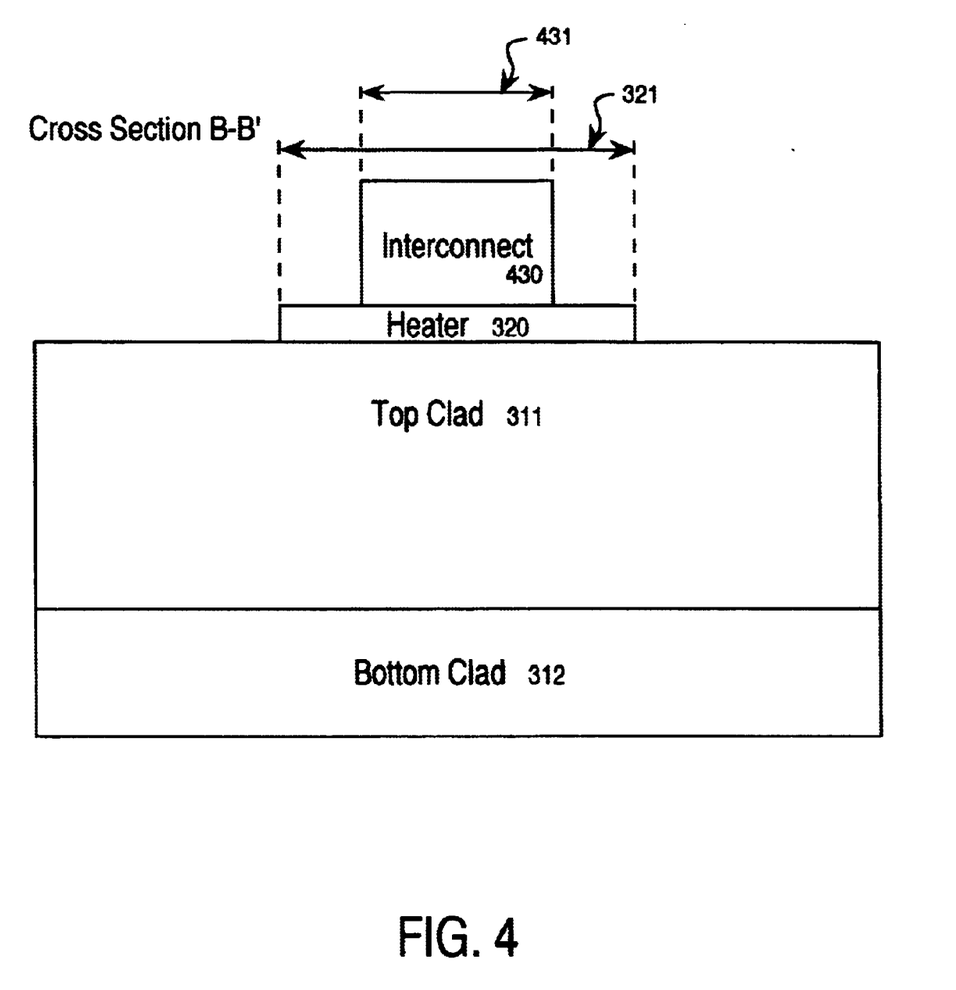
FIG. 4 shows a second cross-section view of an optical waveguide structure of a PLC device in accordance with one embodiment of the present invention.
Figure 5:
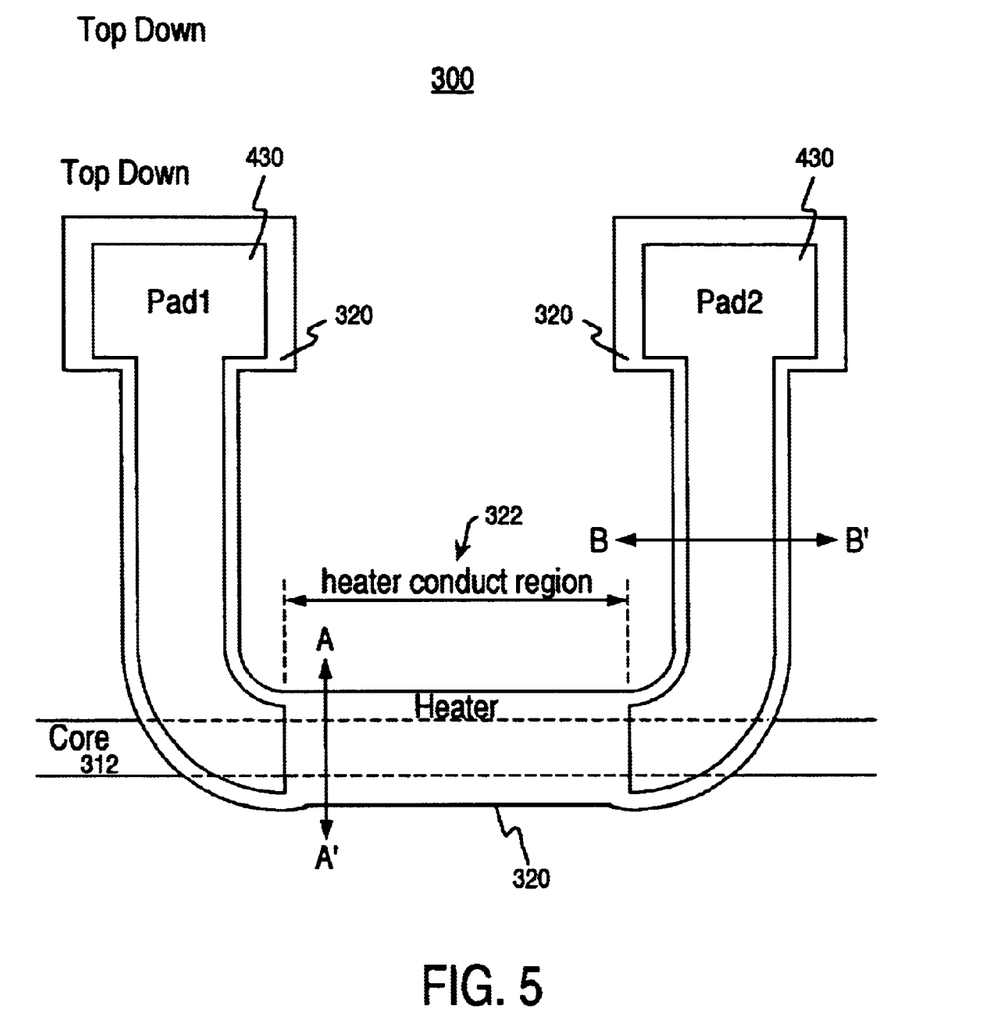
FIG. 5 shows a top-down view of a PLC device in accordance with one embodiment of the present invention.

The following FIGS. 3 and 4 show cross-section views of a waveguide structure of an active PLC device 300, shown in FIG. 5 in a top-down view.

FIG. 3 shows a cross-section view A–A' of an active type optical waveguide structure of a PLC device 300 in accordance with one embodiment of the present invention. Core 310 comprises a doped $SiO_2$ glass core formed over an $SiO_2$ bottom cladding layer 312. A $SiO_2$ top cladding layer 311 covers both core 310 and bottom cladding layer 312. The refractive index of core 310 is higher than that of cladding layers 311 and 312. Consequently, optical signals are confined axially within core 310 and propagate lengthwise through core 310. The $SiO_2$ core 310 is typically doped with Ge or P to increase its refractive index. A heater 320 of critical dimension 321 is located on the surface of the top clad 311 directly above core 310. Heater 320 is used to selectively heat core 310 to change its refractive index via the well-known thermo-optic effect.

FIG. 4 shows a cross-section view B–B' of the waveguide structure PLC device 300. FIG. 4 shows an interconnect 430 disposed above and directly on heater 320. FIG. 4 also shows interconnect 430 having a first width 431 being smaller than a second width 321 of heater 320.

Referring now to FIG. 5, a top-own view of the PLC device 300 shown. As depicted in FIG. 5, heater 320 is shown with overlying interconnect 430. First and second interconnect pads (pad1 and pad2) of interconnect 430 are shown on the left and right side of FIG. 5. Between the first and second pads of interconnect 430 lies a heater conduct region 322 of heater 320. Heater 320 is fabricated from a resistive layer. This material is shown in FIG. 5 as the crosshatched region. The interconnect 430 is fabricated from a conductive layer and is disposed directly above the heater 320. The first and second pads of interconnect 430 function as electrical contact pads for electronic interconnection with external circuits.

Interconnect 430 is made from an interconnect layer of electrically conductive material, preferably aluminum, although other highly conductive metals can be used (e.g., copper, gold, etc., alloys thereof). Heater 320 is made from a resistive layer of electrically resistive material, usually a refractory metal. The resistive layer is preferably tungsten, although other resistive metals can be used (e.g., chrome, titanium, tantalum, nickel, vanadium, platinum, or alloys thereof, etc.).

The heater conduct region 322 is where the voltage across the first and second pads is dissipated. As depicted in FIG. 5, there is no conductor 430 above heater 320 in heater conduct region 322. Thus, current flowing from pad 1 must leave the conductive aluminum interconnect 430 on the left side, flow-through heater 320 in heater conduct region 322, and then back into the conductive aluminum interconnect 430 on the right side and to pad 2. More than 95 percent of the voltage is dissipated in heater conduct region 322. The resulting heat is used to modulate the refractive index of core 312 in the area directly beneath the heater conduct region 322.

As is well known, thin film resistive heaters are used to selectively heat a waveguide core to change its refractive index, and thereby modulate an accumulated phase difference of light propagating through the waveguide core with respect to light flowing through one or more other waveguide cores. The heat and the refractive index relationship is referred to as the "thermo-optic effect", wherein the refractive indices change as the temperature is changed. A variety of thermo-optic effect based devices are used in a variety of systems, such as, for example, optical switches, variable optical attenuators (VOAs), dynamic gain flattening filters (DGFF), and integrated devices such as a VMUX (VOA plus MUX).

The metallization process for fabricating active PLC device 300 in accordance with the present invention is now described in FIGS. 6–10 below.

Figure 6:
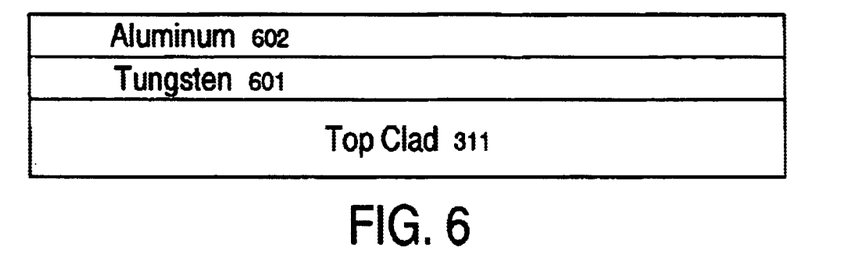
FIG. 6 shows a diagram of a PLC device after the deposition of the tungsten resistive layer and aluminum interconnect layer in accordance with one embodiment of the present invention.

FIG. 6 shows PLC device 300 after the deposition of a tungsten resistive layer 601 and an aluminum interconnect layer 602. The resistive layer 601 is deposited first directly on top of top clad 311, and interconnect layer 602 is subsequently deposited over the resistive layer. As described above, tungsten is preferably used for the resistive layer 601 and aluminum is used for the interconnect layer 602. The resistive layer 601 and interconnect layer 602 are deposited across the entire surface of the PLC wafer.

Figure 7:
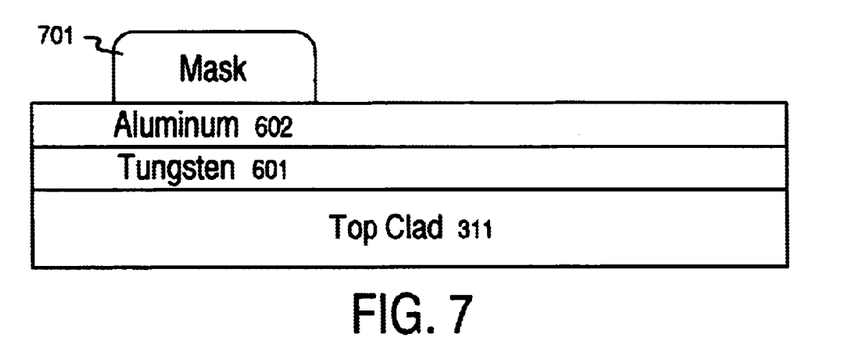
FIG. 7 shows a diagram of the PLC device after photolithographic patterning to form and aluminum interconnect in accordance with one embodiment of the present invention.

FIG. 7 shows PLC device 300 after photolithographic patterning. Photolithographic techniques are used to form a mask 701 which will be used to form aluminum interconnect 430.

Figure 8:
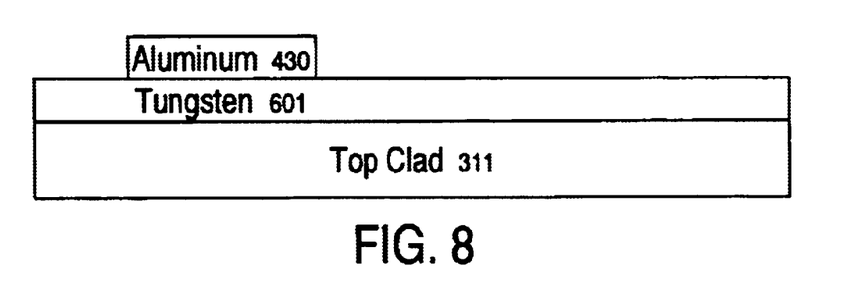
FIG. 8 shows a diagram of the PLC device after etching and mask removal to define the aluminum interconnect.

FIG. 8 shows PLC device 300 after etching and removal of mask 701. The etching defines heater interconnect 430 over resistive layer 601. A wet or dry etch process can be used to define heater interconnect 430, wherein the chemistry used to etch the aluminum does not attack the tungsten of resistive layer 601.

Figure 9:
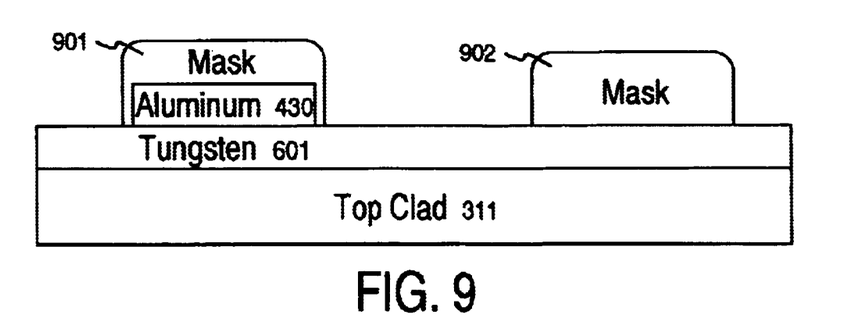
FIG. 9 shows a diagram of the PLC device after the heater interconnect is patterned and masked.

FIG. 9 shows PLC device 300 after heater interconnect 430 is masked (mask 901). The area of resistive layer 601 which will be used to make heater conduct region 322 is also masked (mask 902). It should be noted that mask 901 covers a larger area of tungsten layer 601 than aluminum interconnect 430. This is done to ensure the width of aluminum interconnect 430 is smaller than the width of the heater directly beneath.

Figure 10:
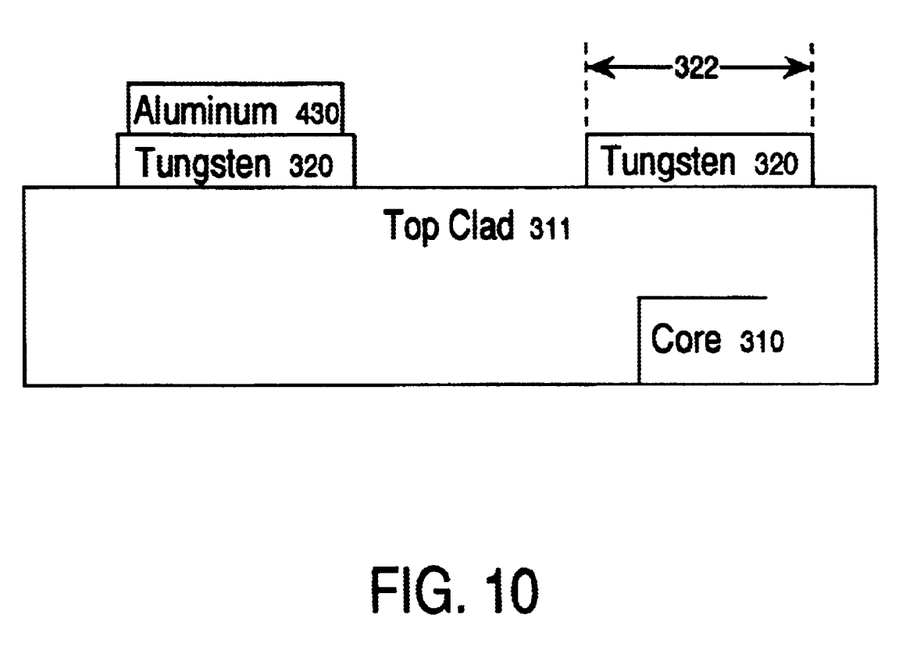
FIG. 10 shows a diagram of the PLC device after the resistive layer is etched to define the resistive heater, both beneath the aluminum interconnect and in the heater conduct region, and the removal of the masks.

FIG. 10 shows PLC device 300 after the resistive layer is etched to define resistive heater 320, beneath aluminum interconnect 430 and in heater conduct region 322, and the removal of masks 901–902. FIG. 10 also shows a larger portion of top clad 311 in order to show the included core 310 disposed beneath heater conduct region 322.

Thus, both the resistive layer and the interconnect layer can be deposited prior to the patterning and etching steps. Alternatively, each metal (the resistive and the conductive) can be deposited in pattern separately, in separate passes. Preferably, both metal layers are deposited in the same pass, tungsten first, and aluminum second, to save steps in the fabrication process.

It should be noted that heater interconnect 430 is disposed entirely over resistive heater 320, and has a smaller width than the resistive heater such that a portion of the resistive heater is exposed entirely around the periphery of the heater interconnect. The difference between the smaller width of heater interconnect 430 and the larger width of underlying resistive heater 320 is sized to be sufficiently large to decrease an alignment sensitivity of a lithography process for masking the heater interconnect. Hence, resistive heater 320 is essentially an "oversize" version of heater interconnect 430, less heater conduct region 322. Thus the only critical alignment is that of the heater conduct region of the resistive heater with respect to underlying waveguide core 310. This eliminates the interconnect alignment problems of the prior art fabrication processes. The oversize also helps prevent undercut, thereby improving adhesion.

It should also be noted that a dry etch process can be used to etch aluminum interconnect layer 602 and/or tungsten resistive layer 601. The dry etch process can be a reactive ion etching process. A wet etch process can be used to etch aluminum interconnect layer 602, wherein the wet etch process does not attack tungsten layer 601. Both the dry and wet etch processes are less expensive and less time-consuming than the prior art wet etch processes for chrome and gold. Chemicals involved in the etching of aluminum and tungsten are much less hazardous than those involved with the etching of chrome. This eliminates the prior art problems from dealing with chrome and gold in PLC device fabrication.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, thereby to enable others skilled in the art to best utilize the invention and various embodiments with various modifications as are suited to the particular use contemplated. It is intended that the scope of the invention be defined by the claims appended hereto and their equivalents.

What is claimed is:

1. A method for making a resistive heater for a planar lightwave circuit, the method comprising:

depositing a resistive layer on a top clad of a planar lightwave circuit;

depositing an interconnect layer onto the resistive layer, wherein the resistive layer comprises tungsten and the interconnect layer comprises aluminum;

etching the interconnect layer to define a heater interconnect, wherein the heater interconnect is disposed over the resistive layer and has a first width;

masking the heater interconnect; and etching the resistive layer to define a resistive heater, wherein the resistive heater is disposed beneath the heater interconnect and has a second width larger than the first width.

2. The method of claim 1 wherein the heater interconnect is defined to include a heater conduct region between a first contact pad and a second contact pad such that a current between the first contact pad and the second contact pad is conducted through the resistive heater.

3. The method of claim 1 wherein the difference between the first width of the heater interconnect and the second width of the resistive heater is determined to decrease an alignment sensitivity of a lithography process for masking the heater interconnect.

4. The method of claim 1 further including the step of using a dry etch process to etch the interconnect layer.

5. The method of claim 4 wherein the dry etch process is a reactive ion etching process.

6. The method of claim 1 further including the step of using a dry etch process to etch the resistive layer.

7. The method of claim 6 wherein the dry etch process is a reactive ion etching process.

8. A method for making a resistive heater for an active planar lightwave circuit, the method comprising the steps of:

a) depositing a tungsten resistive layer on a top clad of a planar lightwave circuit;

b) depositing an aluminum interconnect layer onto the resistive layer such that the tungsten resistive layer functions as an adhesion layer for the aluminum interconnect layer;

c) etching the aluminum interconnect layer to define a heater interconnect, wherein the heater interconnect is disposed over the tungsten resistive layer and has a first width;

d) masking the heater interconnect; and e) etching the tungsten resistive layer to define a resistive heater, wherein the resistive heater is disposed beneath the heater interconnect and has a second width larger than the first width.

9. The method of claim 8 wherein the heater interconnect is defined to include a heater conduct region between a first contact pad and a second contact pad such that a current between the first contact pad and the second contact pad is conducted through the resistive heater.

10. The method of claim 8 further including the step of using a wet etch process to etch the aluminum interconnect layer, wherein the wet etch process does not attack the tungsten resistive layer.

11. The method of claim 8 wherein the difference between the first width of the heater interconnect and the second width of the resistive heater is determined to decrease an alignment sensitivity of a lithography process for masking the heater interconnect.

12. The method of claim 8 further including the step of using a dry etch process to etch the interconnect layer.

13. The method of claim 12 wherein the dry etch process is a reactive ion etching process.

14. The method of claim 8 further including the step of using a dry etch process to etch the resistive layer.

15. The method of claim 14 wherein the dry etch process is a reactive ion etching process.

16. A method for making a thermo-optic resistive heater for an active planar lightwave circuit, the method comprising the steps of:

a) depositing a tungsten layer on a top clad of a planar lightwave circuit;
   b) depositing an aluminum layer onto the tungsten layer such that the tungsten layer functions as an adhesion layer for the aluminum layer;
   c) masking a region of the aluminum layer to be subsequently defined as a heater interconnect;
   d) etching the aluminum layer to define the heater interconnect, wherein the heater interconnect is disposed over the tungsten layer and has a first width;
   e) masking the heater interconnect and masking a region of the tungsten layer to be subsequently defined as a resistive heater; and
   f) etching the tungsten resistive layer to define the resistive heater, wherein the resistive heater is disposed beneath the heater interconnect and has a second width larger than the first width.

17. The method of claim 16 wherein the heater interconnect is defined to include a heater conduct region between a first contact pad and a second contact pad such that a current between the first contact pad and the second contact pad is conducted through the resistive heater.

18. The method of claim 16 further including the step of using a wet etch process to etch the aluminum interconnect layer, wherein the wet etch process does not attack the tungsten resistive layer.

19. The method of claim 16 wherein the difference between the first width of the heater interconnect and the second width of the resistive heater is determined to decrease an alignment sensitivity of a lithography process for masking the heater interconnect.

20. The method of claim 1 wherein the resistive layer is a refractory metal or an alloy of a refractory metal.

21. The method of claim 1 wherein the resistive layer includes titanium, cobalt, or nickel, and the interconnect layer includes aluminum, gold, or copper.

* * * * *